(12) United States Patent
Abdo et al.

(10) Patent No.: US 8,307,103 B2
(45) Date of Patent: Nov. 6, 2012

(54) TEAR-FREE REMOTE DESKTOP PROTOCOL (RDP) DISPLAY

(75) Inventors: Nadim Y. Abdo, Redmond, WA (US); Wilhelm R. Schmieder, Snoqualmie, WA (US); Elton Saul, Kirkland, WA (US); Voicu Anton Albu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 12/400,688

(22) Filed: Mar. 9, 2009

(65) Prior Publication Data

US 2010/0228871 A1    Sep. 9, 2010

(51) Int. Cl.
*G06F 15/16* (2006.01)
*G06F 3/048* (2006.01)
(52) U.S. Cl. .................... 709/230; 709/201; 715/790
(58) Field of Classification Search .............. 709/201, 709/230, 203; 715/790
See application file for complete search history.

(56) References Cited

U.S. PATENT DOCUMENTS

| | | | |
|---|---|---|---|
| 7,234,144 B2 | 6/2007 | Wilt | |
| 7,274,368 B1* | 9/2007 | Keslin | 345/522 |
| 7,439,937 B2 | 10/2008 | Ben-Shachar | |
| 7,506,318 B1* | 3/2009 | Lindo et al. | 717/130 |
| 2005/0243866 A1* | 11/2005 | Koguchi | 370/474 |
| 2006/0031854 A1 | 2/2006 | Godwin | |
| 2006/0082583 A1 | 4/2006 | Leichtling | |
| 2006/0184545 A1* | 8/2006 | Suzuki | 707/10 |
| 2006/0184614 A1 | 8/2006 | Baratto | |
| 2006/0195895 A1* | 8/2006 | Ben-Shachar et al. | 726/11 |
| 2007/0024524 A1 | 2/2007 | Lai | |
| 2007/0046980 A1 | 3/2007 | Coleman | |
| 2007/0052723 A1 | 3/2007 | Subramanian | |
| 2007/0124474 A1* | 5/2007 | Margulis | 709/226 |
| 2008/0129868 A1 | 6/2008 | Simpson | |
| 2008/0204464 A1 | 8/2008 | Roh | |
| 2008/0209538 A1* | 8/2008 | Malakapalli et al. | 726/12 |
| 2008/0219149 A1 | 9/2008 | Yoo | |
| 2008/0301566 A1 | 12/2008 | Abdo | |

OTHER PUBLICATIONS

"[MS-RDPEGDI]: Remote Desktop Protocol: Graphics Device Interface (GDI) Acceleration Extensions," Microsoft Corporation, http://download.microsoft.com/download/9/5/E/95EF66AF-9026-4BB0-A41D-A4F81802D92C/%5BMS-RDPEGDI%5D.pdf, Oct. 24, 2008, p. 1-262.

Paul et al., "Chromium Renderserver: Scalable and Open Remote Rendering Infrastructure," IEEE, http://www-vis.lbl.gov/Publications/2008/LBNL-63693-CRRS.pdf, 2008, p. 1-14.

"HP Remote Graphics Software," Hewlett-Packard Development Company, Inc., http://h20331.www2.hp.com/hpsub/cache/286504-0-0-225-121.html, 2008, p. 1-2.

PCT Application No. PCT/US2010/025682: International Search Report and Written Opinion of the International Searching Authority, Sep. 29, 2010, 9 pages.

* cited by examiner

*Primary Examiner* — Peling Shaw
*Assistant Examiner* — Thomas Richardson
(74) *Attorney, Agent, or Firm* — Woodcock Washburn LLP

(57) ABSTRACT

Systems, methods and computer readable media are disclosed for reducing the tearing of display data received across a communications network. A server determines at least two logically related drawing orders in an order heap and warps those orders with a begin marker and an end marker. It sends those wrapped orders across the communications network to a client. The client receives those orders and renders them to a shadow buffer. When the client processes the end marker, it moves the drawing orders in the shadow buffer to a client display surface.

19 Claims, 5 Drawing Sheets

402 determining at least two logically related drawing orders in an order heap, the logically related drawing orders having a start and an end 404 wrapping the logically related drawing orders by placing a begin marker and at the start of the logically related drawing orders, and placing an end marker at the end of the end of the logically related drawing orders 406 sending the client the wrapped logically related drawing orders across a communications network, with an indication to display all of the logically related drawing orders simultaneously

Fig. 4

TEAR-FREE REMOTE DESKTOP PROTOCOL (RDP) DISPLAY

BACKGROUND OF THE INVENTION

Although computers were once isolated and had minimal or little interaction with other computers, today's computers interact with a wide variety of other computers through communications networks, such as Local Area Networks (LANs) and Wide Area Networks (WANs). With the wide-spread growth of the INTERNET™, connectivity between computers is becoming more important and has opened up many new applications and technologies. The growth of large-scale networks, and the wide-spread availability of low-cost personal computers, has fundamentally changed the way that many people work, interact, communicate, and play.

One increasing popular form of networking may generally be referred to as virtual computing systems, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the INTERNET). As such, the user has the experience as if their machine is operating as part of a LAN, when in reality the client device is only sent screenshots of the applications as they appear on the server side.

In a remote session, "screen tearing" may occur on a display where a newly rendered frame partially overlaps a previously rendered frame, creating a torn look as two parts of a displayed object do not line up. This most commonly occurs in a remote desktop protocol (RDP) session during periods of rapid drawing, such as for animation or video playback. Screen tearing will become more significant as RDP advances in areas such as bitmap encoding, bulk compression and the transport stack. It would therefore be an improvement over the prior art to group related graphics data to ensure that it is rendered as a single visual unit, as well as to logically batch related drawing orders that should be copied from the shadow buffer to the display surface as a group.

SUMMARY OF THE INVENTION

This logically batching of instructions may be added by the RDP server. This addition may be accomplished by allowing an application that has display output sent through RDP to insert "begin-logical-frame" and "end-logical-frame" markers. This may also be accomplished by a component of the RDP system examining the received stream of encoded drawing orders, from there determining a start and end of related drawing orders and at those points inserting "begin-logical-frame" and "end-logical-frame" markers.

In an exemplary embodiment, a server determines at least two logically related drawing orders in an order heap and warps those orders with a begin marker and an end marker. It sends those wrapped orders across the communications network to a client. The client receives those orders and renders them to a shadow buffer. When the client processes the end marker, it moves the drawing orders in the shadow buffer to a client display surface.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media in accordance with this specification are further described with reference to the accompanying drawings in which:

FIG. 4 illustrates exemplary operational procedures for server-side tear-free remote display.

DETAILED DESCRIPTION OF ILLUSTRATIVE EMBODIMENTS

Figure 1:
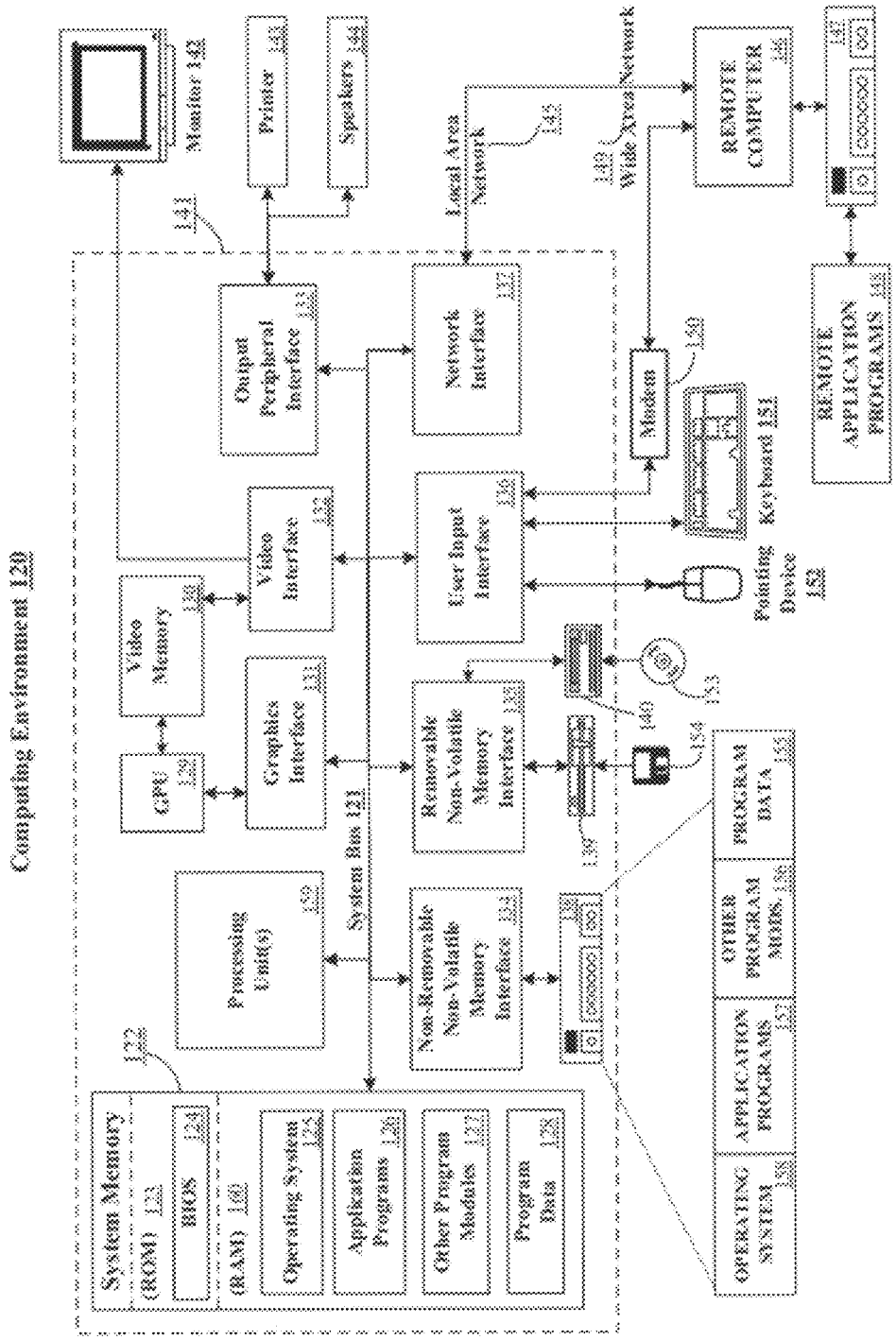
FIG. 1 illustrates an exemplary general purpose computing environment in which in which the tear-free remote display described herein may be embodied.

FIG. 1 is a block diagram of a general purpose computing device in which the techniques described herein may be employed. The computing system environment 120 is only one example of a suitable computing environment and is not intended to suggest any limitation as to the scope of use or functionality of the presently disclosed subject matter. Neither should the computing environment 120 be interpreted as having any dependency or requirement relating to any one or combination of components illustrated in the exemplary operating environment 120. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer readable media. Computer readable media can be any available media that can be accessed by computer 141 and includes both volatile and nonvolatile media, removable and non-removable media. The system memory 122 includes computer storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 1 illustrates operating system 125, application programs 126, other program modules 127, and program data 128.

The computer 141 may also include other removable/non-removable, volatile/nonvolatile computer storage media. By way of example only, FIG. 1 illustrates a hard disk drive 138 that reads from or writes to non-removable, nonvolatile magnetic media, a magnetic disk drive 139 that reads from or writes to a removable, nonvolatile magnetic disk 154, and an optical disk drive 140 that reads from or writes to a removable, nonvolatile optical disk 153 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 140 are typically connected to the system bus 121 by a removable memory interface, such as interface 135.

The drives and their associated computer storage media discussed above and illustrated in FIG. 1, provide storage of computer readable instructions, data structures, program modules and other data for the computer 141. In FIG. 1, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 1. The logical connections depicted in FIG. 1 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 150 or other means for establishing communications over the WAN 149, such as the Internet. The modem 150, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 1 illustrates remote application programs 148 as residing on memory device 147. It will be appreciated that the network connections shown are exemplary and other means of establishing a communications link between the computers may be used.

Figure 2:
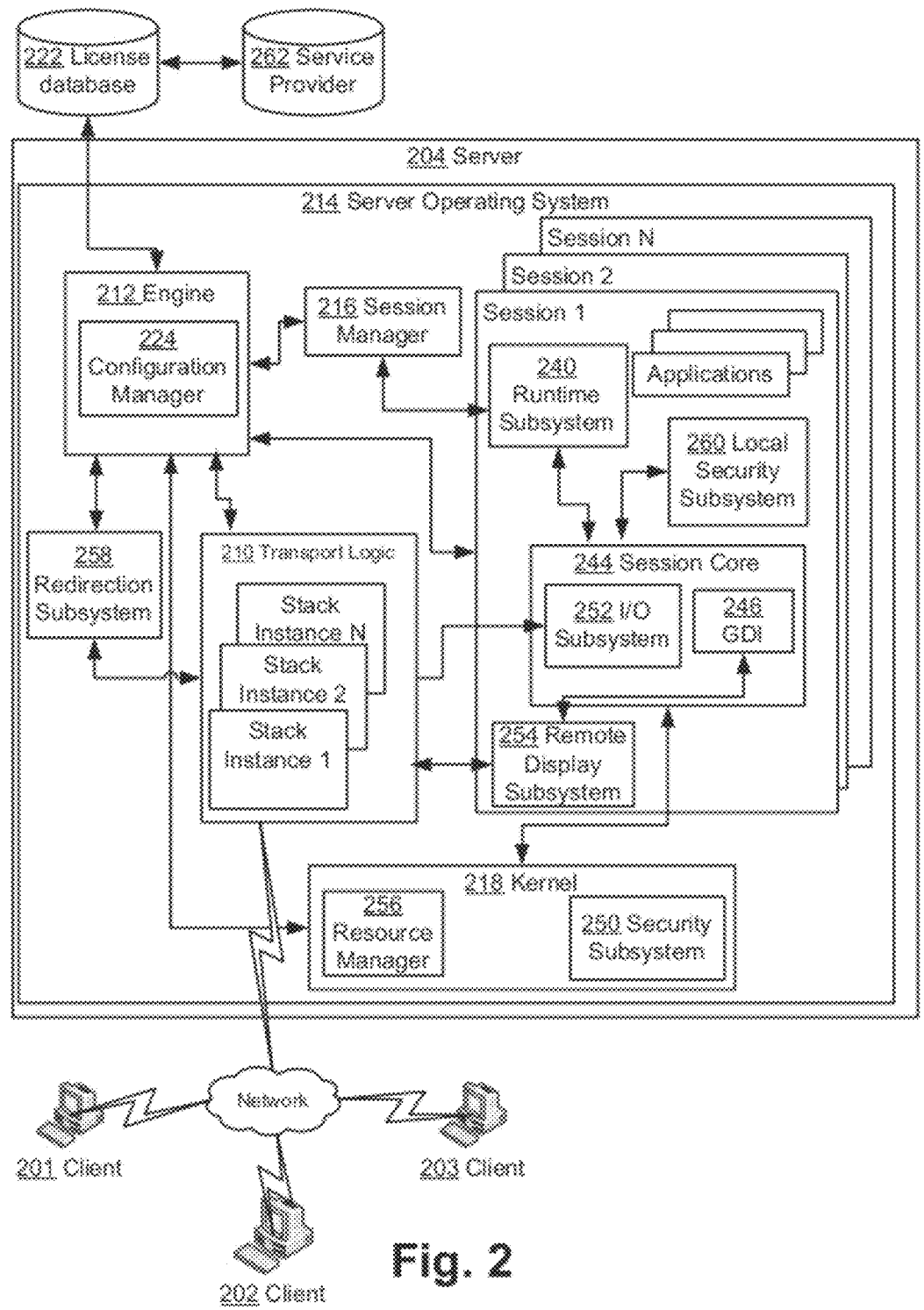
FIG. 2 depicts an operational environment for practicing aspects of the present disclosure.

Referring now to FIG. 2, it generally illustrates an example environment wherein aspects of the present disclosure can be implemented. One skilled in the art can appreciate that the example elements depicted by FIG. 2 provide an operational framework for describing the present disclosure. Accordingly, in some embodiments the physical layout of the environment may be different depending on different implementation schemes. Thus the example operational framework is to be treated as illustrative only and in no way limit the scope of the claims. One skilled in the art can also appreciate that the following discussion is introductory and the elements depicted by FIG. 2 are described in more detail within the discussion of the operational procedures of FIG. 3 through FIG. 8.

Generally, FIG. 2 depicts a high level overview of a terminal server environment that can be configured to include aspects of the present disclosure. In reference to the figure, a server 204 is depicted that can include circuitry configured to effectuate a terminal server and for example, three example clients 201, 202, and 203 (while three clients are depicted the server 204 in embodiments can service more or less clients). The example clients 201-203 can include computer terminals effectuated by hardware configured to direct user input to the server 204 and display user interface information generated by the server 204. In other embodiments, clients 201-203 can be computers that include similar elements as those of computer 20 FIG. 1. In these example embodiments, clients 201-203 can include circuitry configured to effect operating systems and circuitry configured to emulate the functionality of terminals. In these examples one skilled in the art can appreciate that the circuitry configured to effectuate the operating systems can also include the circuitry configured to emulate terminals.

In the depicted example, the server 204 can be configured to generate one or more sessions for connecting clients 201, 202, and 203 such as sessions 1 through N (where N is an integer greater than 1). Briefly, a session in example embodiments of the present disclosure can generally include an operational environment that is effectuated by a plurality of subsystems, e.g., software code, that are configured to effectuate an execution environment and interact with a kernel 218 an operating system 214. For example, a session can include a shell and a user interface such as a desktop, the subsystems that track mouse movement within the desktop, the subsystems that translate a mouse click on an icon into commands that effectuate an instance of a program, etc. In another example embodiment the session can include an application.

In this example while an application is rendered, a desktop environment may still be generated and hidden from the user. The session in this example can include similar subsystems as the session described above. Generally, a session can be generated by the server 204 on a user by user basis when, for example, the server 204 receives a connection request over a network connection from a client such as client 201. Generally, a connection request can first be handled by the transport logic 210 that can, for example, be effectuated by circuitry of the server 204. The transport logic 210 can in some embodiments include a network adaptor, firmware, and software that can be configured to listen for connection messages and forward them to the engine 212. As illustrated by FIG. 2, when sessions are generated the transport logic 210 can include protocol stack instances for each session. Generally, each protocol stack instance can be configured to route user interface output to an associated client and route user input received from the associated client to the appropriate session core 244.

As depicted by FIG. 2, during the session generation process the engine 212 can be configured to obtain a license for the session. For example, in one example embodiment the engine 212 can receive a license from the client 201 during the session generation process. In other example embodiments the engine 212 can receive a copy of a license from a license database 222. In some embodiments of the present disclosure the license database 222 can include a relational database management program that can be executed on an operating system of a computer such as computer 20 of FIG. 1. In an example embodiment that includes a license database 222, it can store one or more licenses that can be checked out when a client attempts to obtain a session from the server 204. In another embodiment each license can itself be associated with an account identifier, e.g., a username/password combination, a smartcard identifier, etc., and each license can only be checked out if the correct account identifier is presented. Generally, the number of connections that a server 204 can generate can be dependent upon the number of licensees the entity that controls the server 204 has purchased from a service provider. If for example, the entity has purchased one license, then the server 204 can be configured to only allow one session. In this example if the license is associated with an account identifier, then only a user that presents the correct account identifier can obtain a session.

In example embodiments of the present disclosure each license can be validated by a service provider 262 before they can be used. For example, the service provider 262 can in example embodiments act as a certificate authority that aphorizes and activates licenses and servers. In these embodiments the service provider 262 can ensure that licenses are not stolen, copied, or pirated. The service provider 262 can also ensure that the license are only used by the server 204 they are purchased for by storing a copy of the licenses in a database and associating the licenses with server 204.

As illustrated by FIG. 2, a configuration manager 224 in an example embodiment of the present disclosure can include computer readable instructions that when executed instantiate a process that can receive a license during the session creation process and determine a service level for a newly spawned session by interfacing with various subsystems such as session manager 216. The session manager 216 in an embodiment can be configured to initialize and manage each session by for example, generating a session identifier for a session space; adding the session identifier to a table; assigning memory to the session space; and generating system environment variables and instances of subsystem processes in memory assigned to the session space. As illustrated by FIG. 2, in an embodiment the session manager 216 can instantiate environment subsystems such as a runtime subsystem 240 that can include a kernel mode part such as the session core 244. For example, the environment subsystems in an embodiment can be configured to expose a subset of services to application programs and provide an access point to the kernel 218 of the operating system 214. As illustrated by FIG. 2, in some embodiments the kernel 218 can include a security subsystem 250 and a resource manager 256. In an example embodiment the security subsystem 250 can enforce security policies of the server 204 by, for example, performing runtime object protection. In these embodiments the resource manager 256 in an embodiment can create and terminate processes and threads in response to requests from the runtime subsystem 240. More specifically, in an embodiment the runtime subsystem 240 can request the execution of threads and the session core 244 can send requests to the executive of the kernel 218 to allocate memory for the threads and schedule time for them to be executed.

Continuing with the description of FIG. 2, in an embodiment the session core 244 can include a graphics display interface 246 (GDI) and an input subsystem 252. The input subsystem 252 in an example embodiment can be configured to receive user input from a client 201 via the protocol stack instance associated with the session and transmit the input to the session core 244. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and processed by the GDI 246. The GDI 246 in general can include a process that can generate graphical object draw commands. The GDI 246 in this example embodiment can be configured to pass the commands to the remote display subsystem 254 that can instantiate a display driver for the session. In an example embodiment the remote display subsystem 254 can be configured to include virtual display driver(s) that may not be associated with displays physically attacked to the server 204, e.g., the server 204 could be running headless. The virtual display driver in this embodiment can be configured to receive the draw commands and transmit them to the client 201 via a stack instance associated with the session.

Figure 3:
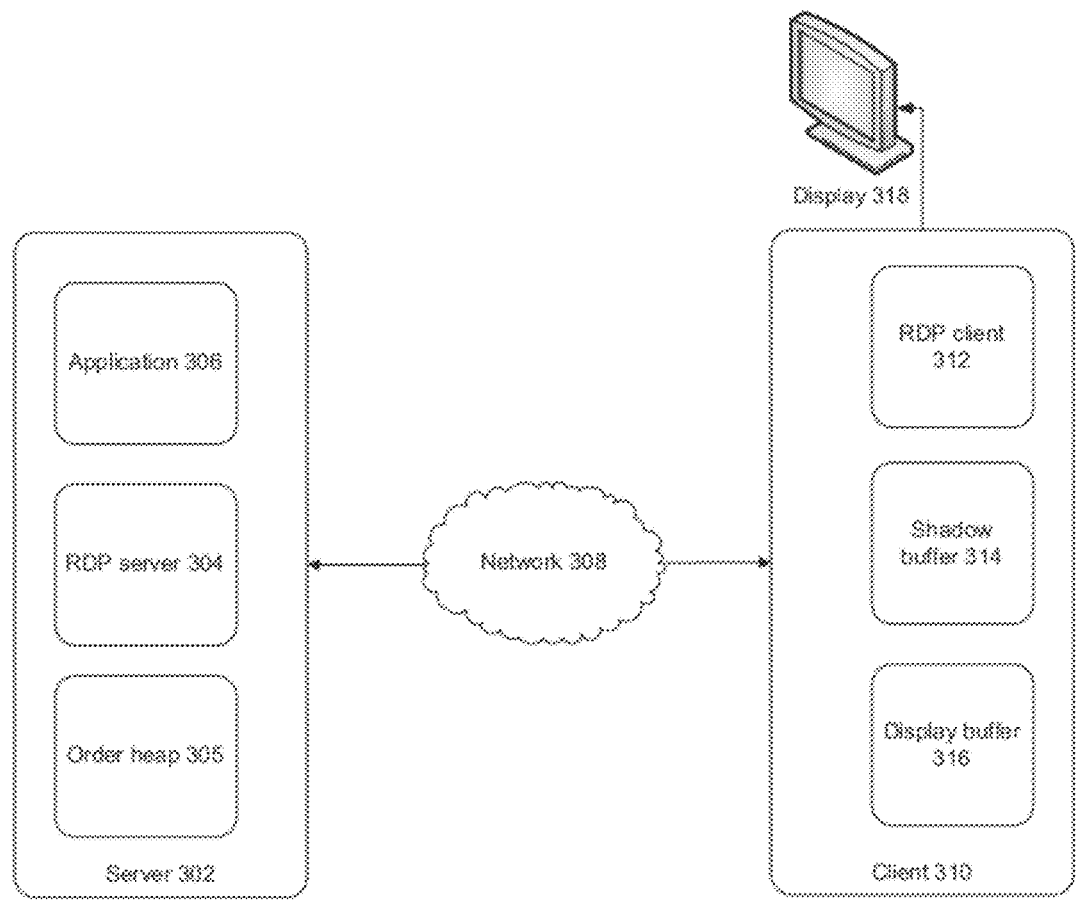
FIG. 3 illustrates a client and server communicating via a remote desktop protocol (RDP) that utilizes tear-free remote display techniques.

FIG. 3 illustrates a client 310 and server 302 communicating via a remote desktop protocol (RDP) that utilizes tear-free remote display techniques.

In an embodiment where tear-free remote display techniques are not present, a server 302 is executing an application 306, such as a video player, and sending the output to a client 310 via a RDP session comprising a RDP server 304 and a RDP client 312. The application 306 continually outputs to a display by issuing drawing commands, such as graphics device interface (GDI) application 306 programming interface (API) commands. This can be done with bitblock transfer (BitBlt) from a source bitmap to a destination bitmap. These commands are then translated into display driver interface (DDI) calls (such as Win32K DDI calls) that are dispatched to a remote desktop protocol display driver (RDPDD). The RDPDD encodes the DDI calls into RDP drawing orders.

The RDP drawing orders are placed into an "order heap" 305 in memory shared with a remote desktop protocol windows driver (RDPWD) of the RDP server 304 that serves as keyboard and mouse driver that receives keyboard and mouse input over the TCP connection and presents them as keyboard or mouse inputs. RDPWD also allows creation of virtual channels, that allow other devices, such as disc, audio, printers, and COM ports to be redirected, i.e., the channels act as replacement for these devices. The channels connect to the client 310 over the TCP connection across the network 308; as the channels are accessed for data, the client 310 is informed of the request, which is then transferred over the TCP connection to the application 306. This entire procedure is done by the terminal server 302 and the client 310, with the RDP protocol mediating the correct transfer, and is entirely transparent to the application 306.

Then, the RDPWD driver associated with the stack that is connected to the client 310 extracts the drawing orders from the order heap. That RDPWD bulk compresses the drawing orders and wraps them within RDP transport structures, then sends them down the stack to the client 310.

The client 310 receives these drawing orders in RDP transport structures. It extracts the drawing orders from the RDP transport structures and renders them to a shadow buffer. When at most a pre-determined number of orders have been rendered to the shadow buffer, the dirty areas of the shadow buffer are copied to a user-visible display surface.

For instance, if the pre-determined number of orders is 25 and the client 310 receives a RDP packet containing 54 orders, the client 310 will progressively render to the display surface as follows. It will render the first 25 orders, then it will render the second 25 orders, and then it will render the remaining four orders.

Rendering from the shadow buffer 314 to the display surface 316 (which corresponds to output on display device 318) at this arbitrary pre-determined number of orders (here, 25) may result in the user momentarily viewing an incomplete image (the tearing). This problem will also persist where each order is immediately rendered to the display surface.

In an embodiment with tear free techniques, the application 306 that is executing on a server 302 and has display output remotely displayed on a client 310 may instruct RDPDD to insert "begin" and "end" frame markers.

In such an embodiment, an application 306, such as a video player, executes on the server 302. The application 306 signals the remote desktop protocol display driver of the RDP server 304 through an application 306 programming interface (API) call that a logical frame is to be drawn. In response to this call, RDPDD adds a "begin" marker to an order heap 305, a place where drawing orders are stored for processing. The application 306 draws the frame by issuing GDI drawing commands. These GDI commands are translated into display driver interface (DDI) calls that are dispatched to the RDPDD driver of the RDP server 304. RDP encodes the DDI calls into RDP drawing orders. These encoded drawing orders are placed into the order heap 305 in memory that is shared with the RDPWD driver. RDPDD adds an "end" marker to the order heap 305. The RDPWD driver associated with the stack that is connected to the client 310 extracts the drawing orders from the shared memory. The drawing orders are bulk compressed and wrapped within RDP transport structures and sent down the stack to the client 310 across a communications network 308.

In another embodiment, the server 302 may examine a received stream of encoded drawing orders and place "begin" and "end" frame markers where appropriate.

In such an embodiment, an application 306, such as a video player, executes on the server 302. The application 306 affects its visual display output by issuing GDI drawing commands. These commands are translated into DDI calls that are then dispatched to the RDPDD driver of the RDP server 306. RDPDD encodes the DDI callbacks into RDP drawing orders. The encoding drawing orders are placed into the order heap 305 in memory that is shared with the RDPWD driver. A "RDP batching engine" scans the orders in the order heap to determine if there are any orders that are logically related. Any related orders are wrapped with "begin" and "end" markers. The RDPWD driver associated with the stack that is connected to the client 310 extracts the drawing orders from the order heap. It bulk compresses the drawing orders and wraps them within RDP transport structures, then sends them down the stack and to the client 310 across a communications network 308.

A client 310 may receive RDP transport structures from both the embodiment where an application 306 that is executing on a server 302 and has display output remotely displayed on a client 310 may instruct RDPDD to insert "begin" and "end" frame markers, and the embodiment where the server 302 examines a received stream of encoded drawing orders and place "begin" and "end" frame markers where appropriate When the client 310 receives RDP transport structures, it extracts the drawing orders from those transport structures. If a "begin" marker is encountered, then any subsequent drawing orders in the RDP stream that are rendered to the shadow buffer 314 are not copied to the display surface 316 and thus the display device 318 until the corresponding "end" marker is encountered. If no "begin" marker is identified, then the client 310 may use the existing graphics decoding pipeline.

FIG. 4 illustrates exemplary operational procedures for server-side tear-free remote display.

Operation 402 depicts determining at least two logically related drawing orders in an order heap, the logically related drawing orders having a start and an end.

In an embodiment, the logically related drawing orders are logically related because an image frame comprises the logically related drawing orders. The drawing orders that make up an image frame may be grouped together because they will be displayed together. The start of these logically related drawing orders may be the first drawing order that will be executed and the end may be the last drawing order that will be executed. This may correspond to the upper-left corner of a rectangular image and the bottom right corner of that rectangular image.

In an embodiment, the logically related drawing orders are logically related because one thread produced each logically related drawing order. In a multi-threaded system, multiple processes may execute. Where each process has a single thread that issues drawing orders, then one may determine that the drawing orders from different threads are likely not logically related, and that the drawing orders emanating from one thread likely are logically related.

Threads typically switch in two instances. The first is when the thread voluntarily relinquishes its turn on the processor because it has completed its task. This may typically occur where a thread has completed issuing drawing orders for an image frame. Thus, in an embodiment, this may be used as an indication that all drawing orders issued by the thread during its turn where it was active on a processor are logically related and comprise a frame. The second instance is where a thread runs out of its allotted time in which to execute on a processor.

In this case, while it is likely that every drawing order issued by the thread during this period of executing is logically related, it may be that drawing orders issued by the thread when it next executes on a processor are also logically related to this present thread. In an embodiment, the logically related drawing orders span from when a thread next regains use of a processor after voluntarily giving it up until it next voluntarily gives up use of a processor.

A thread may be determined according to its thread ID (TID). Where a process has multiple threads that issue logically related drawing orders, similar techniques as the above may be used, and the processes may be distinguished according to their process ID (PID).

In an embodiment, the logically related drawing orders are logically related because they correspond to one portion of a display. An application window may comprise a contiguous region of a display surface. It may then be determined that those orders that correspond to a particular portion of the display surface are all generated by a single process and therefore are logically related.

In an embodiment, the logically related drawing orders are logically related because they were issued at a similar time. Drawing orders for a frame are typically issued temporally near to each other, making it more likely that a drawing order is logically related to one issued temporally near to it than temporally far from it. It may also be determined that two drawing orders are not logically related when a temporally intervening drawing order is issued between them.

In an embodiment, a drawing order comprises an application programming interface (API) call, and the begin marker and the end marker each comprise a call to the API. For instance, where drawing orders are issued by making calls to the graphics device interface (DDI) application programming interface (API), the API may be expanded to have special begin_marker( ) and end_marker( ) function calls that are used to signify the beginning and the end of the marker, respectively.

In an embodiment, the logically related drawing orders are logically related based on the application type. This may be used where only drawing orders emanating from the same application are logically related.

Operation 404 depicts wrapping the logically related drawing orders by placing a begin marker and at the start of the logically related drawing orders, and placing an end marker at the end of the end of the logically related drawing orders.

In an embodiment, the begin and the end are determined by an application from which the logically related drawing orders originate. Such an "aware" application may be designed to keep track of which drawing orders are logically related, and send an indication of such to a component that inserts the begin and end markers. As the application likely knows the dimensions of a frame, and when a particular frame is being generated through drawing orders, there is an advantage of efficiency of it marking logically related drawing orders, as opposed to some later component doing the same having only a stream of drawing orders from which to make these determinations.

In an embodiment, the application wraps the logically related drawing orders. Rather than sending an indication of where the begin and end markers are to occur, the application may insert these itself. For instance, where these markers comprise an API call as above, the application may be the entity that issues these begin_marker( ) and end_marker( ) calls.

In an embodiment, the logically related drawing orders correspond to a screen scrape with a known start and a known end, and wrapping the logically related drawing orders further comprises placing the begin marker at the known start and placing the end marker at the known end. A screen scrape may comprise image data as it is intended for display on a display device, such as a bitmap. It may comprise the entire screen, or a subportion thereof. Typically, the dimensions of the image being "scraped" are known, so the start (typically the upper leftmost pixel where the scrape is rectangular) and the end (typically the lower rightmost pixel in that situation) are known as well, and begin and end markers may then be placed appropriately.

In an embodiment, the end marker comprises a transmission control protocol (TCP) flush command. A TCP flush command may be an indication for a TCP layer of a network protocol stack to send all currently held data to the next lower layer in the stack for transmission across a communications network. A TCP flush command typically comprises a null buffer that is zero bytes long. Where an entity sets the end marker by making an API call, such as the above end_marker( ) call, that call may operate to insert a TCP flush command in its place.

Operation 406 depicts sending the client the wrapped logically related drawing orders across a communications network, with an indication to display all of the logically related drawing orders simultaneously.

In embodiment, the wrapped logically related drawing orders are sent across the communications network in a packet, and the packet is sent when the end marker is inserted into the packet. Considerations of efficiency come into play when choosing a packet size to send across a communications network. Each packet comprises header information, so sending a series of packets with small payloads results in sending a small amount of data (the payloads) relative to the metadata (the header information). However, sending a large packet results in that packet spending an increased amount of time on a network control path (such as a wire, or a part of wireless spectrum), leading to an increased chance that some other device will send a packet at that time on that path, causing a collision where both packets are lost, and must be resent.

In this embodiment, all logically related drawing orders are sent in a single packet. This ensures that they arrive at the client at the same time. Where they are sent in multiple packets, the client will still wait on the final packet, containing the end marker, to display the logically related drawing orders.

In an embodiment, a packet has a minimum packet size, further comprising: sending the packet when the end marker is inserted into the packet, when the minimum packet size of the packet is reached. Where the logically related drawing orders comprise only a few drawing orders, it may not be efficient to send such a small packet, for reasons discussed above. In this case, new drawing orders may be added to the packet until it reaches a minimum packet size, and then it is sent. In an embodiment, the packet is sent once the first end marker has been inserted into it once the minimum packet size has been reached. In an embodiment, the packet is sent once the first end marker has been inserted into it once the minimum packet size has been reached, or a maximum packet size is reached.

In an embodiment, the packet is sent via a plurality of protocol layers, further comprising: flushing the packet to the communications network, by each protocol layer, when detecting the end marker. In an embodiment, the protocol layers for a network comprise application layer (e.g. hypertext transfer protocol, or HTTP), transport layer (e.g. TCP), internet layer (e.g. internet protocol, or IP), link layer (e.g. Ethernet), and physical layer (e.g. RJ45/CAT5). Where those layers have a flush command, the end marker may comprise the flush command for each layer, so that by inserting the end marker, the packet is flushed through all layers and sent across the communications network. In an embodiment, where two layers share the same flush command, it is not repeated for each layer.

In an embodiment, the wrapped logically related drawing orders are sent according to a remote desktop protocol (RDP).

Figure 5:
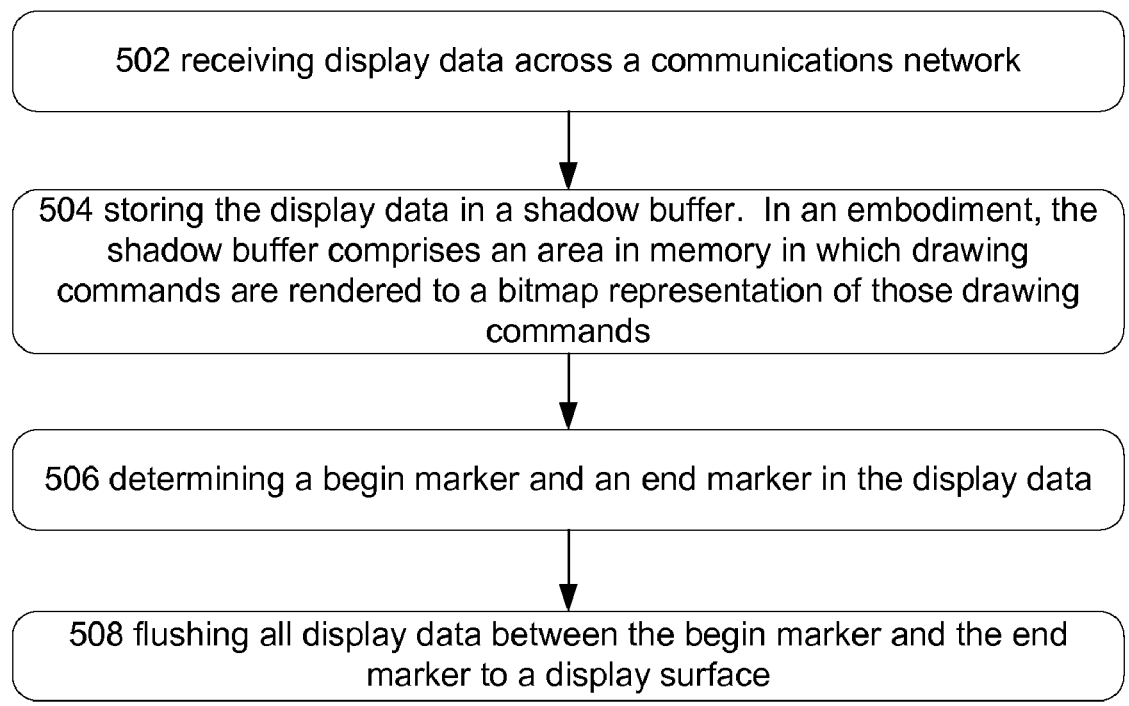
FIG. 5 illustrates exemplary operational procedures for client-side tear-free remote display.

FIG. 5 illustrates exemplary operational procedures for client-side tear-free remote display.

Operation 502 depicts receiving display data across a communications network. In an embodiment, this data is received as RDP packets as sent by the server as depicted in operation 306.

Operation 504 depicts storing the display data in a shadow buffer. In an embodiment, the shadow buffer comprises an area in memory in which drawing commands are rendered to a bitmap representation of those drawing commands. The shadow buffer may correspond to a display buffer, where the data that is displayed on a display device exists. When the data in the shadow buffer is to be displayed, it is then copied to the display buffer, and new data may be rendered to the shadow buffer. In an embodiment, the shadow buffer and the display buffer exist in video memory of the system. In an embodiment, the display data comprises drawing commands. In another embodiment, the display data comprises an image, such as a bitmap.

Operation 506 depicts determining a begin marker and an end marker in the display data. Where the display data comprises a plurality of drawing commands in an API, this may comprise identifying the commands corresponding to begin_marker( ) and end_marker( ).

Operation 508 depicts flushing all display data between the begin marker and the end marker to a display surface. Where the display surface corresponds to a display buffer, this may comprise transferring all data in shadow buffer to the display buffer. Where data in the shadow buffer is identified by whether it has been updated since it was last moved to the display buffer, such as with a dirty bit, it may be that only those dirty parts of the shadow buffer are copied to the display buffer.

In an embodiment, there is a timer, and flushing all display data includes flushing all display data between the begin marker and the most recently received display data, including the most recently received display data, when a timer expiration of the timer is reached. Where the end marker is delayed, be it in generation or transport, it may be preferable to display some new display data on the display surface so that the end user does not find the session to be unresponsive, or think that it has frozen. In this case, every time the display buffer is updated, the timer is reset, and if the timer should reach a specified time before an end marker is received, it is flushed to the display surface.

In the embodiment where the timer has expired, then the end marker is received, the operation may then flush all flush all display data received since the timer expiration was reached when end marker is determined.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed is:

1. A method for reducing tearing in an application display on a client, comprising:
   determining at least two logically related drawing orders in an order heap, the logically related drawing orders having a start and an end;
   wrapping the logically related drawing orders by placing a begin marker and at the start of the logically related drawing orders, and placing an end marker at the end of the end of the logically related drawing orders;
   inserting the wrapped logically related drawing orders into a packet; and
   in response to inserting the end marker into the packet, the end marker being the first end marker inserted into the packet, sending the packet across a communications network, the client flushing received display data that is between the begin marker and the most recently received display data, including the most recently received display data, upon reaching a timer expiration of a timer.

2. The method of claim 1, wherein the logically related drawing orders are logically related because an image frame comprises the logically related drawing orders.

3. The method of claim 2, wherein the logically related drawing orders are logically related because one thread produced each logically related drawing order.

4. The method of claim 2, wherein the logically related drawing orders are logically related because they correspond to one portion of a display.

5. The method of claim 2, wherein the logically related drawing orders are logically related because they were issued at a similar time.

6. The method of claim 1, wherein the start and the end are determined by an application from which the logically related drawing orders originate.

7. The method of claim 6, wherein the application wraps the logically related drawing orders.

8. The method of claim 1, wherein a drawing order comprises an application programming interface (API) call, and the end marker comprises a call to the API indicative of the end of a group of logically related drawing orders.

9. The method of claim 1, wherein a packet has a minimum size for transmission, and wherein in response to inserting the end marker into the packet, the end marker being the first end marker inserted into the packet, sending the packet across the communications network comprises:
   in response to inserting the end marker into the packet, the end marker being the first end marker inserted into the packet, and in response to determining that the minimum size for transmission of the packet has been reached, sending the packet across the communications network.

10. The method of claim 1, wherein the packet is sent via a plurality of protocol layers, further comprising:
    flushing the packet to the communications network, by each protocol layer, when detecting the end marker.

11. The method of claim 1, wherein the logically related drawing orders correspond to a screen scrape with a known start and a known end, and wrapping the logically related drawing orders further comprises:
    placing the begin marker at the known start and placing the end marker at the known end.

12. The method of claim 1, wherein the end marker comprises a transmission control protocol (TCP) flush command.

13. The method of claim 1, wherein the wrapped logically related drawing orders are sent according to a remote desktop protocol (RDP).

14. The method of claim 1, wherein the application has a type, further comprising:
    the logically related drawing orders are logically related based on the application type.

15. A system for reducing tearing in an application display comprising display data received across a communications network, comprising:
    a processor; and
    a memory communicatively coupled to the processor when the system is operational, the memory bearing instructions that, upon execution by the processor, cause the system to at least:
        receive display data across a communications network, the display data being part of a network packet comprising an end marker, the end marker being the first end marker inserted into the packet, the network packet having been sent to the system in response to the end marker being inserted into the packet;
        store the display data in a shadow buffer;
        determine a begin marker and an end marker in the display data stored in the shadow buffer; and
        flush the display data in the shadow buffer that is between the begin marker and the most recently received display data, including the most recently received display data, upon reaching a timer expiration of a timer.

16. The system of claim 15, the instructions that, upon execution by the processor, cause the system to at least flush display data further cause they system to at least:
    flush display data received since the timer expiration was reached when the end marker is determined.

17. The system of claim 15, wherein the shadow buffer comprises at least one dirty display data, and the instructions that, upon execution by the processor, cause the system to at least flush display data further cause they system to at least:
    flush only the display data that is dirty.

18. A computer readable storage medium, comprising computer-readable instructions that, when executed on a processor, cause operations comprising:
    determining at least two logically related drawing orders in an order heap, the logically related drawing orders having a start and an end, the logically related drawing orders comprising a frame, the logically related drawing orders comprising calls to an application programming interface (API);
    wrapping the logically related drawing orders by placing a begin marker before the start of the logically related drawing orders, and placing an end marker after the end of the logically related drawing orders, the begin marker and the end marker each comprising a call to the API;
    inserting the wrapped logically related drawing orders into a packet; and
    in response to inserting the end marker into the packet, the end marker being the first end marker inserted into the packet, sending the packet to the client across a communications network via a remote desktop protocol (RDP), with an indication to display all of the logically related drawing orders simultaneously, the client flushing received display data that is between the begin marker and the most recently received display data, including the most recently received display data, upon reaching a timer expiration of a timer.

19. The computer readable storage medium of claim 18, wherein a packet has a minimum packet size, and wherein sending the packet to the client further comprises:
    sending the packet to the client in response to determining that the minimum packet size of the packet is reached.

\* \* \* \* \*